Aug. 30, 1960    E. COWLES ET AL    2,950,570
METHOD AND APPARATUS FOR PRODUCING ALKALINE SILICATES
Filed June 8, 1951    4 Sheets-Sheet 1
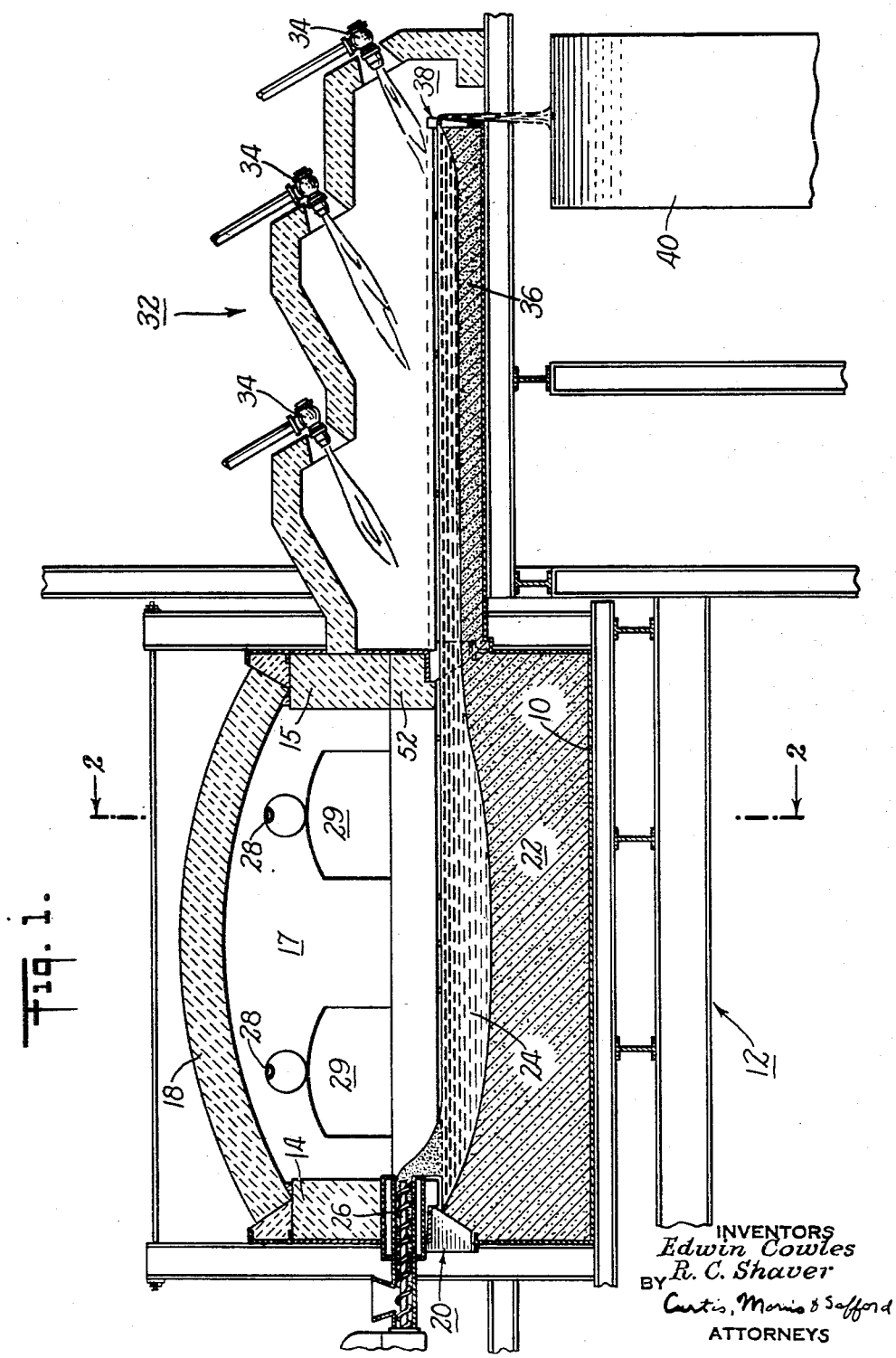
INVENTORS
Edwin Cowles
R. C. Shaver
BY Curtis, Morris & Safford
ATTORNEYS

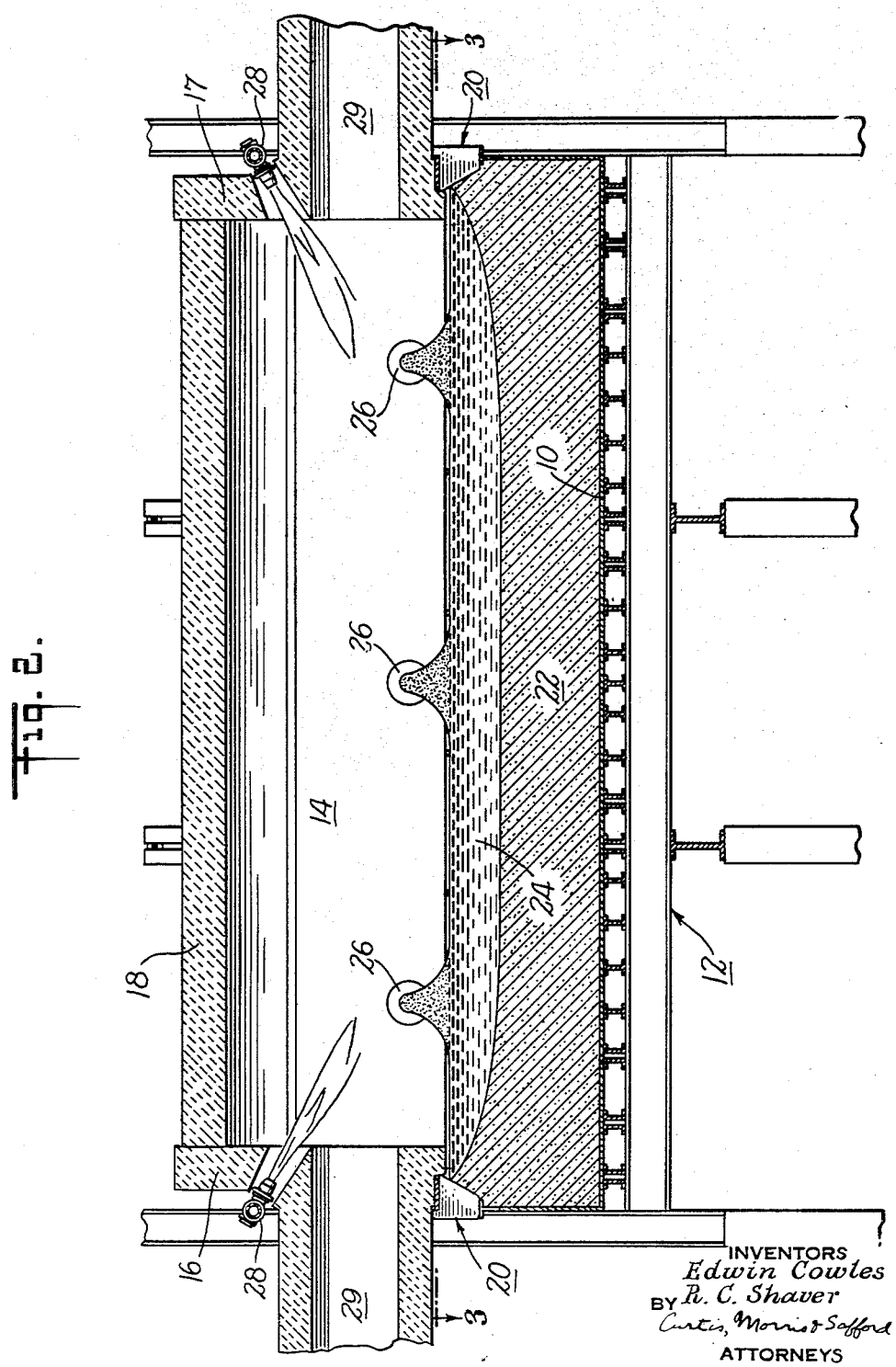

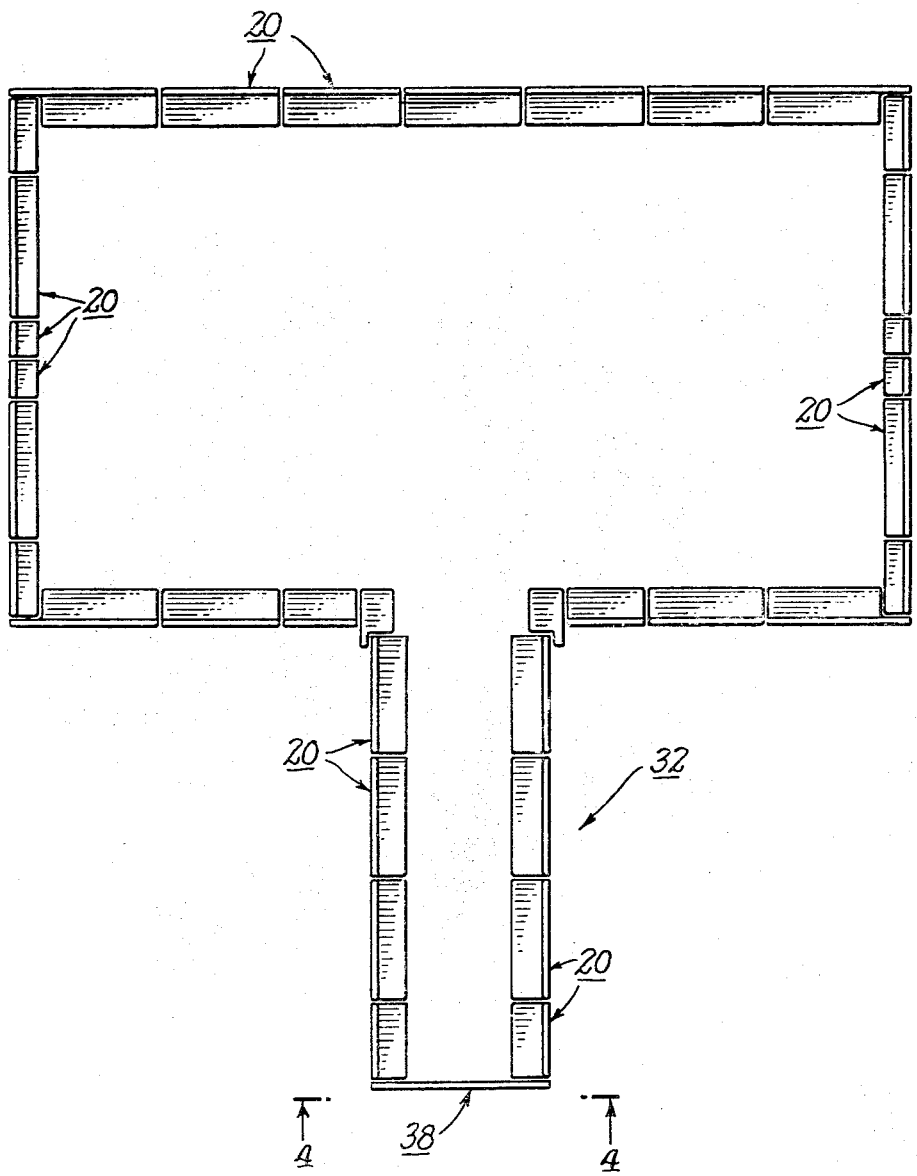

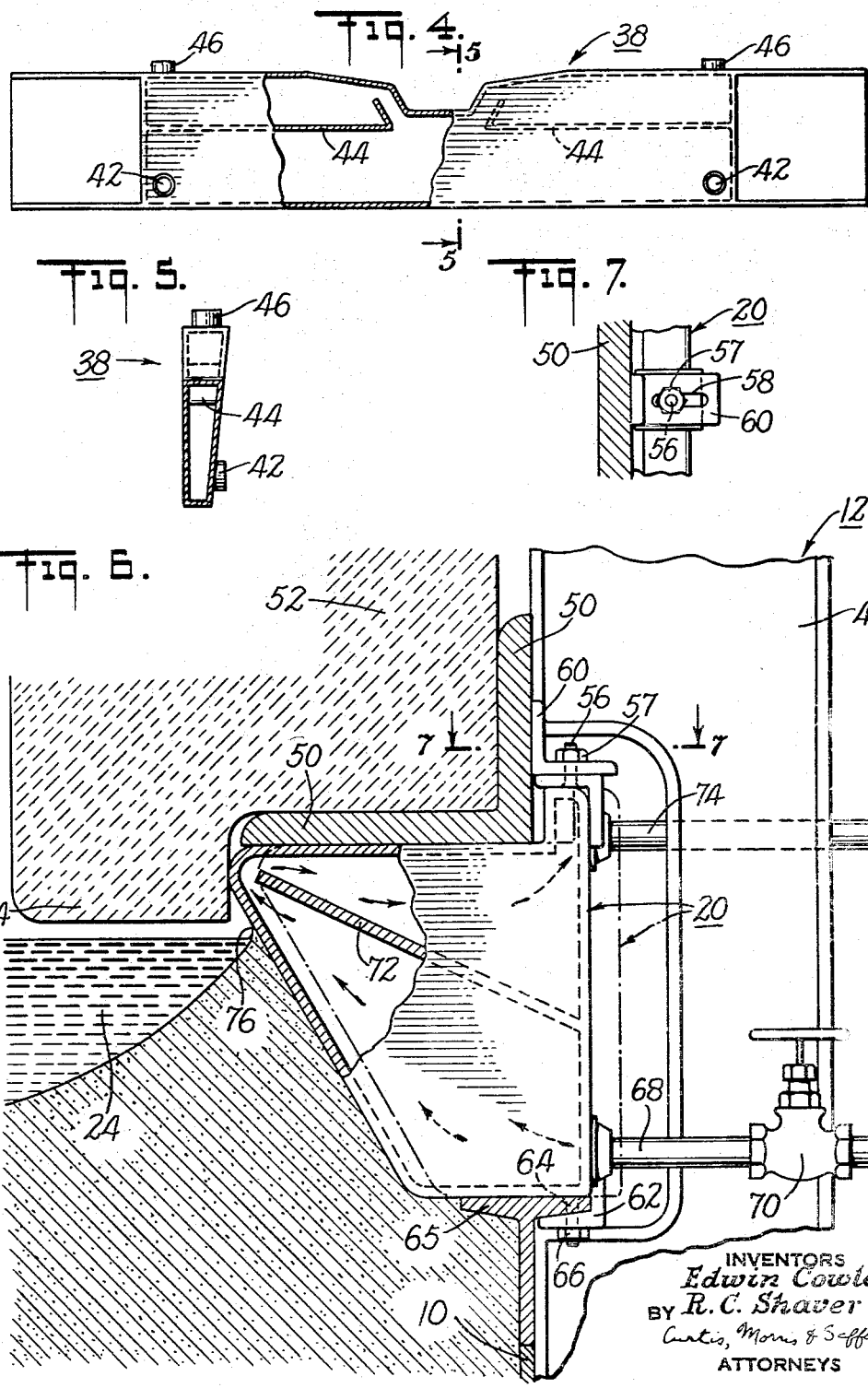

United States Patent Office 2,950,570
Patented Aug. 30, 1960

2,950,570

METHOD AND APPARATUS FOR PRODUCING ALKALINE SILICATES

Edwin Cowles, Cayuga, and Richard C. Shaver, Syracuse, N.Y., assignors to Cowles Chemical Company, Cleveland, Ohio, a corporation of Ohio Filed June 8, 1951, Ser. No. 230,662

15 Claims. (Cl. 49—53)

This invention relates generally to method and apparatus for the high temperature treatment of normally solid materials which, when in the molten state, are corrosive toward the commonly used refractories. In a more specific aspect, the invention relates to an improved method and apparatus for producing anhydrous sodium silicates. The present method and apparatus are particularly useful in making anhydrous sodium metasilicate and will be illustratively described in connection with the production of this substance, although as the description proceeds it will become apparent that they may be used for the production of other fusible metal silicates as well, and that certain of the apparatus features of the invention are useful in the production of materials other than metal silicate.

This application is a continuation in part of our pending application Serial No. 179,679, filed July 3, 1950, now abandoned.

Anhydrous sodium metasilicate may be made by the reaction of sand and soda ash in a suitable furnace at temperatures of the order of 2000° F. or greater to produce a molten metasilicate that is withdrawn from the furnace as product. The temperatures required in carrying out the reaction are so high that it is not practicable to use unprotected metal surfaces in the construction of the furnace, and therefore the furnace must normally be either constructed of or lined with a refractory material.

Sodium metasilicate and soda ash are strongly alkaline substances and in the molten state have a corrosive effect on the commonly used refractories. This tendency of the molten silicate and carbonate to attack the refractory material of which the furnace is constructed gives rise to two problems. On the one hand, it limits the extent to which the process can be carried out on a continuous scale, since the melt eventually eats through the refractory wall or lining of the furnace, thus making it necessary to shut down the furnace for repairs. On the other hand, to the extent that the melt dissolves the furnace wall, impurities are introduced into the product. For many applications, sodium metasilicate is dissolved in water and used in the form of an aqueous solution. The commonly used refractories contain aluminum which, with other constituents of the refractory, become dissolved in the molten silicate in the furnace. When the metasilicate product is subsequently dissolved in water, the aluminum precipitates as complex sodium-aluminosilicates and forms an undesirable flocculent suspension in the solution. Thus it is highly desirable from at least two points of view to minimize the corrosive effect of the silicate melt on the furnace refractory.

It is an object of the present invention to provide an improved method and apparatus for the production of alkali metal silicates. It is another object of the invention to provide an improved method and furnace for the production of sodium metasilicate wherein the refractory walls of the furnace do not come into contact with the molten metasilicate. It is still another object of the invention to provide a method of making sodium metasilicate wherein the reaction can be carried more nearly to completeness than has heretofore been possible. It is a still further object of the invention to provide a method of making sodium metasilicate wherein a higher reaction temperature can be used and thus a larger volume of product produced in a given size of furnace operating under a given set of conditions. It is still another object of the invention to provide a continuous process for producing anhydrous sodium metasilicate that is more nearly pure than the product produced by prior continuous processes. It is another object of the invention to provide an improved furnace for treatment of normally solid materials which in the molten state are corrosive toward the commonly used refractories. It is still another object of the invention to provide a furnace for the production of sodium metasilicate wherein the molten silicate can be retained in the furnace for a relatively long, controllable period of time. Other objects of the invention will be in part obvious and in part pointed out hereafter.

In one of its broader method aspects, the present invention comprises a process for producing an alkaline silicate which includes the steps of forming a body of an alkaline silicate in the solid phase, heating the central top portion of the body of solid silicate to form a relatively quiescent pool of molten silicate completely supported by the solid silicate, feeding to the pool a mixture of silica in the form of sand and an alkaline material which is reactive with the sand to produce the desired silicate, maintaining the pool at a temperature to cause the sand and alkaline material to react to form the desired silicate, and withdrawing the molten silicate from the pool as product.

In a somewhat narrower aspect the invention comprises a process for producing an alkaline silicate having an $M_2O:SiO_2$ mole ratio between 0.25:1 and 1.75:1 which process includes the steps of forming a body of an alkaline silicate in the solid phase having an $M_2O:SiO_2$ ratio between 0.25:1 and 1.75:1, heating the central top portion of the body of solid silicate to form a relatively quiescent pool of molten silicate completely supported by the solid silicate, and feeding to the pool a mixture of silica in the form of sand and an alkaline material which is reactive with the sand to produce the desired silicate, the sand and alkaline material being mixed in approximately the stoichiometrical proportion required to produce the desired silicate. As indicated above, the pool is maintained at the proper temperature to cause the sand and alkaline material to react to form the desired silicate and molten silicate is withdrawn from the pool as product. It will of course be understood that "M" in the expression $M_2O:SiO_2$ refers to univalent metals, and that where the silicate is a compound of a polyvalent metal the expression requires modification in well-known manner.

In a still narrower aspect, the method is carried out as described above and the bed is formed of a solid silicate in comminuted form having a composition substantially the same as that of the reaction product. By using a bed composed of the reaction product in solid form, the possibility of chemical attack by the corrosive melt on the pool-supporting material is completely eliminated. Also if any of the bed material adjacent to the pool fuses and mixes with the melt, no change in the composition of the reaction product occurs. The use of a supporting bed in comminuted form retards flow of heat from the pool.

It should be noted that while the use of a bed having substantially the same composition as the reaction product is preferred, it is not essential. For example, during continuous operation of the process it is possible to change the proportions of the raw materials fed and thereby produce a reaction product differing significantly in $M_2O:SiO_2$ ratio from the material of which the bed is composed. Also it is possible to form the bed initially of an unreacted mixture of sand and alkaline material having the desired $M_2O:SiO_2$ ratio and causing the upper central portion of the bed materials to react during the early stages of the process to form a silicate.

In still another aspect, the present invention comprises a method of making any of various sodium silicates having an $Na_2O:SiO_2$ ratio between about 0.25:1 and 1.75:1. The method is particularly useful in the production of anhydrous sodium metasilicate, but may also be used with advantage in making the disilicate and sesquisilicate, as well as silicates having an $Na_2O:SiO_2$ ratio appreciably above or below that of the sodium silicates specifically mentioned. For example, silicates of the type used in the manufacture of water glass and containing say 3–4 mols of $SiO_2$ per mol of $Na_2O$, e.g. $Na_2O:3.3\ SiO_2$, can be made with advantage by the present process. Also mixtures can be made having a composition which indicates that they contain a substantial proportion of the orthosilicate. The sodium silicates are preferably made, in accordance with the present method, by reaction between silica in the form of sand and sodium carbonate in the form of commercial soda ash. It has been observed that comminuted sodium metasilicate forms a particularly good bed for the production of a variety of sodium silicates having $Na_2O:SiO_2$ ratios between 0.25:1 and 1.75:1.

In the production of sodium metasilicate by the present process it is preferable to use a quantity of sodium carbonate that is about 4–5% by weight in excess of that stoichiometrically required. The reaction is preferably carried out in a pool of molten metasilicate supported in a bed of sodium metasilicate in solid comminuted form. The temperature of the pool is desirably maintained between 2000° and 2700° F. The bed of solid silicate should be sufficiently deep to provide a solid layer of substantial thickness between the bottom of the pool and the container for the bed. This thick layer of solid silicate serves as an effective insulating layer to retard outflow of heat from the bottom of the pool and also precludes the possibility of molten silicate coming in contact with the structure supporting the bed.

The use of a molten reaction pool supported in a bed of the solid silicate provides a number of important advantages. In the first place, since danger of corrosion of the furnace walls is virtually eliminated, the temprature of the reaction mass may be maintained substantially higher than is otherwise possible, and hence a more rapid rate of reaction and greater productivity from a given size of furnace can be achieved. Also, it has been found that by using the present method, the reaction proceeds more nearly to completion. In certain prior methods of making sodium metasilicate it was necessary to use a considerable excess of soda ash and even so the product contained unreacted silica; whereas with the present method, due to the use of a pool wherein the materials can be retained for a relatively long period of time, the reaction can be carried out with only a slight excess of soda ash to yield a product substantially free from unreacted silica. The use of the molten reaction pool presents the important advantage that by regulating the relation between feed rate and pool temperature the reaction time is readily controllable.

In order to point out more fully the nature of the present invention, a preferred embodiment of the present method will now be described in connection with the accompanying drawing which illustrates apparatus capable of carrying out the method of the invention and including certain structural features embodying the apparatus aspect of the invention. In the drawing:

Figure 1 is a vertical section through the furnace showing the reaction pool, one of the feed conveyors, and the forehearth through which the molten product is drawn from the furnace;

Figure 2 is a vertical section taken on the line 2—2 of Figure 1, i.e. at right angles to Figure 1, and showing a pair of burners and flue gas outlet passages;

Figure 3 is a horizontal section taken on the line 3—3 of Figure 2, and showing the cooling chambers arranged around the periphery of the furnace;

Figure 4 is an elevation, partly in section, of the overflow dam over which the molten product flows in leaving the furnace;

Figure 5 is a vertical section through the overflow dam taken on the line 5—5 of Figure 4 and showing the internal construction thereof;

Figure 6 is an enlarged vertical section through one of the cooling chambers; and, Figure 7 is a plan view taken on the line 7—7 of Figure 6 and showing a portion of the mounting of the cooling chamber which renders it adjustable.

Referring to the drawings and more particularly to Figures 1 and 2, the lower portion of the furnace comprises a rectangular metal tank or vessel 10, supported on a suitable structural steel framework 12. The upper portion of the furnace is made of refractory brick and comprises the conventional side walls 14 and 15, end walls 16 and 17, and arch 18. Interposed between the upper periphery of the vessel 10 and the refractory top of the furnace are a series of cooling chambers 20 which will be more fully described hereafter.

The vessel 10 is substantially filled with a body of comminuted sodium metasilicate which forms a bed 22 that supports a reaction pool 24 of the molten silicate. A mixture of sand and soda ash in the proper proportions is continuously fed to the pool 24 by three screw conveyors 26 mounted in the refractory side wall 14. The mixture fed by the conveyors 26 floats out on the surface of pool 24 and into the pool wherein it reacts to form the metasilicate. Heat to maintain the pool 24 in molten condition and to cause the reaction to proceed is supplied by two pairs of burners 28, one pair being mounted in each of the end walls 16 and 17 of the furnace. The burned gases leave the furnace through the passages 29 formed in the end walls of the furnace. In order to effect desired thermal economy, the furnace shown is preferably of the regenerative type wherein the air for combustion and/or fuel gas is preheated by heat withdrawn from the flue gases. Since regenerative furnaces are well known in the art, the regenerative portions of the present furnace need not be shown in the drawing. It will of course be understood that in accordance with the usual regenerative practice, only one pair of burners 28 is used at a time, and the burned gases are withdrawn from the furnace through the passage 29 at the end of the furnace opposite that in which the operating burners are located.

Referring particularly to Figure 1, the molten silicate is withdrawn from the furnace through a forehearth generally designated 32 and provided with the burners 34 for maintaining the metasilicate in molten condition as it passes therethrough. As in the case of the main part of the furnace, the stream of metasilicate flowing through the forehearth is supported on a bed 36 of comminuted metasilicate. The molten product flows through the forehearth 32 to and over a dam 38, whence it falls on a cool rotating drum 40 whereon it solidifies. The solid product may be removed from the drum by any suitable scraping means (not shown).

The construction of the dam 38 is best shown in Figures 4 and 5 of the drawing. As shown in these figurges, the dam is hollow and is internally cooled with water, which is admitted through the inlets 42, flows around the internal baffles 44 and leaves through the outlet connections 46.

Referring to Figures 3, 6 and 7, the periphery of the furnace at the liquid level of the pool 24 and also the side walls of the forehearth 32 are provided with a series of cooling chambers 20. The construction and mounting of the cooling members 20 is best shown in Figure 6. Referring to Figure 6, the furnace-supporting structural framework 12 includes a series of vertical columns, one of which is designated 48 in Figure 6. Secured to the column 48 there is an angle member 50 which supports the tuckstone 52 that forms part of the first course of refractory brick of the side and end walls of the furnace. The refractory 52 has a downwardly extending portion 54 that extends close to, but does not quite touch, the surface of the pool 24. The downward extension 54 comprises what might be called a "shadow wall" which protects the cooling chamber 20 from the radiant heat of the furnace gases.

The cooling chamber 20 is interposed between the top of tank 10 and the bottom of angle member 50 that supports the refractory wall. It is supported in part and held in place by a bolt 56 that engages a slot 58 (see Fig. 7) in an angle 60 secured to the column 48. The bolt 56 is provided with a nut 57. A similar slotted element 62 is secured to the bottom portion of cooling chamber 20, and engages a bolt 64 secured to the flange 65 of tank 10 and provided with a nut 66. The slotted elements 60 and 62 permit transverse movement, when desired, of the cooling element 20 for a purpose presently to be described.

Cooling elements 20 are internally supplied with cooling water from a pipe 68 having a regulating valve 70. Water enters the interior of cooling element 20 from pipe 68, flows around an internal baffle 72, and out through a discharge pipe 74. The inlet and discharge pipes 68 and 74 usually are so arranged that they have sufficient flexibility to permit the transverse adjustment of cooling chambers 20 as described above. If desired, these water pipes may be provided with sections made of a flexible material to facilitate this adjustment.

As indicated in Figure 6, molten silicate, coming in contact with the surface of cooling chamber 20 forms a solid layer 76 that protects the metal of the cooling chamber from the corrosive action of the molten liquid. In a similar manner, any molten silicate that starts to flow from the furnace between the ends of adjacent cooling chamber 20 solidifies and blocks these passages, thus preventing further flow of the molten material therethrough. The layer of solid silicate 76 extends around the periphery of the furnace and thus in effect defines the perimeter of the pool of molten material.

The adjustable cooling elements 20 constitute an important feature of the present invention. It has been found that when the reaction mass is cooled and reheated, expansion of the mass produces a substantial outward thrust tending to cause the furnace walls to bulge outwardly. It has been further found that this outward force is exerted for the most part at or near the surface of the pool, and by making the cooling elements 20 transversely adjustable, this expansion of the reaction mass can be readily accommodated. The cooling elements 20 also serve to cool the steel supporting structure on which they are mounted, particularly the structure supporting the refractory side walls of the furnace.

It may be noted that as shown in the drawings the tank 10 is uninsulated and its exterior surface is exposed to the surrounding atmosphere. Also the bed 22 is in direct contact with the interior wall of tank 10 without interposition of a refractory material therebetween. It is evident that with the construction shown heat flows from pool 24 through bed 22 to the tank 10 and is dissipated from the exterior wall of the tank to the surrounding atmosphere. During continuous operation of the furnace a steady state condition is achieved with a substantially constant temperature gradient through the bed and with the rate of heat loss through the wall of tank 10 being such as to cause the interface between the pool 24 and bed 22 to remain at a substantially fixed location that is substantially spaced from the tank wall.

The present method and apparatus are useful not only for the production of alkaline sodium silicates, but also in making the other alkali metal silicates, as well as in making certain of the alkaline earth metal silicates. Moreover, it is apparent that certain of the apparatus features of the invention are useful in any case where it is desired to treat at high temperature a material or mixture which in the molten state is corrosive toward the commonly used refractories. Other modifications and alternatives within the scope of the invention will be apparent to those skilled in the art.

We claim:

1. The method of continuously producing an alkali metal silicate which comprises introducing into a container a body of an alkali metal silicate in solid comminuted form, heating the top portion of said body to form a relatively quiescent pool of molten silicate completely supported by said solid silicate, continuously feeding to said pool in approximately stoichiometric proportions a mixture of silica in the form of sand and an alkaline metal compound reactive with said sand to produce the desired alkali metal silicate, maintaining said pool at a temperature to cause said sand and metal compound to react to form said desired silicate, continuously withdrawing molten silicate from said pool as product maintaining said bed in a static state during said continuous production of said silicate, and controlling the heat supplied to said pool, the feed of silica and metal compound to said pool and the withdrawal of product from said pool to balance the heat dissipated at the external surface of said body of silicate while the liquid-solid transition zone between said pool and body of silicate remains substantially spaced from the external surface of said silicate body.

2. The method of continuously producing a sodium silicate having a $Na_2O:SiO_2$ ratio between 0.25:1 and 1.75:1 which comprises forming bed of sodium silicate in solid comminuted form having substantially the composition of the sodium silicate to be produced, heating the top portion of said bed to form a relatively quiescent pool of molten silicate completely supported by said solid silicate, continuously feeding to said pool a mixture of sand and soda ash in approximately the stoichiometric proportions required to produce the desired sodium silicate, maintaining said pool at a temperature to cause said sand and soda ash to react to form said desired silicate, continuously withdrawing molten silicate from said pool as product, maintaining said bed in a static state during said continuous production of said silicate, and controlling the heat supplied to said pool, the feed of said sand and soda ash and the withdrawal of molten silicate from said pool to balance the heat dissipated at the external surface of said bed while the solid-liquid transition zone between said bed and pool remains substantially spaced from the external surface of said bed.

3. A method according to claim 2 and wherein the mixture fed to said pool contains 3 to 4 mols of sand per mol of soda ash to produce a sodium silicate having a $Na_2O:SiO_2$ ratio between 0.25:1 and 0.33:1.

4. A method according to claim 2 and wherein said bed is composed of sodium metasilicate and the mixture fed to said pool comprises approximately equimolar proportions of soda ash and silica.

5. The method of continuously producing an alkali metal silicate which comprises introducing into a container a bed of solid comminuted material selected from the group consisting of the silicate to be produced and a mixture of raw materials capable of reacting to produce said silicate, heating the central top portion of said bed to form a relatively quiescent pool of molten silicate completely supported by said bed, continuously feeding to said pool in approximately stoichiometric proportions a mixture of silica in the form of sand and an alkaline metal compound reactive with said sand to produce the desired alkali metal silicate, maintaining said pool at a temperature to cause said sand and metal compound to react to form said desired silicate, continuously withdrawing molten silicate from said pool as product, maintaining said bed in a static state during said continuous production of said silicate, and controlling the heat supplied to said pool, the feed of sand and alkaline metal compound to said pool and the withdrawal of product from said pool to balance the heat dissipated to the atmosphere at the external surface of said bed while the liquid-solid transition zone between said pool and bed remains substantially spaced from the external surface of said bed.

6. A furnace adapted to be used in making at high temperature a normally solid product which at the operating temperature of the furnace is molten and corrosive toward the common refractories, said furnace comprising an open top, single-walled, uninsulated metal vessel forming the lower portion of said furnace and a refractory top supported above said metal vessel and forming the upper portion of said furnace, said metal vessel containing a static bed of solid comminuted material selected from the group consisting of said product and a mixture of raw materials adapted to react to form said product, said bed being in direct contact with the interior wall of said metal vessel and having in its upper portion a bowl-shaped recess adapted to contain a molten pool of said product, the exterior of said vessel being directly exposed to the surrounding atmosphere, heating means in said refractory top for maintaining said pool in molten condition, feeding means mounted in the walls of said furnace for continuously feeding to said pool materials reactable therein to form said product, and product withdrawal means for continuously withdrawing molten products from said pool.

7. A furnace adapted to be used in making at high temperature a normally solid product which at the operating temperature of the furnace is molten and corrosive toward the common refractories, said furnace comprising an open top, single-walled, uninsulated metal tank forming the lower portion of said furnace and a refractory top supported above said metal tank and forming the upper portion of said furnace, said metal tank containing a static bed of said product in solid comminuted form, said bed being in direct contact with the interior wall of said tank and having in its upper portion a bowl-shaped recess adapted to contain a molten pool of said product, heating means in said refractory top for maintaining said pool in molten condition, feeding means mounted in said refractory top of said furnace for continuously feeding to said pool materials adapted to react therein to form said product, and product withdrawal means for continuously withdrawing said product from said pool.

8. A furnace adapted to be used in making at high temperature a normally solid product which at the operating temperature of the furnace is molten and corrosive toward the common refractories, said furnace comprising an open top, a single-walled, metal tank directly exposed to the surrounding atmosphere and forming the lower portion of said furnace and a refractory top supported above said metal tank and forming the upper portion of said furnace, said metal tank containing a static bed of solid comminuted material selected from the group consisting of alkaline silicates and a mixture of raw materials adapted to react to form an alkaline silicate, said bed having in its upper portion a bowl-shaped recess adapted to contain a molten pool of said product, said tank having no refractory material at either its interior or exterior walls whereby heat can flow from said pool to said bed and through the wall of said tank to the atmosphere surrounding said tank without passing through any refractory material, heating means in said refractory top for maintaining said pool in molten condition, feeding means mounted in the walls of said furnace for continuously feeding a mixture of said raw materials to said pool, and product withdrawal means for continuously withdrawing the molten product from said pool.

9. A furnace according to claim 8 and wherein the depth of said recess is not substantially greater than one-half the depth of said bed.

10. A furnace adapted to be used in making at high temperature a normally solid product which at the operating temperature of the furnace is molten and corrosive toward the common refractories, said furnace comprising an open top, single-walled, uninsulated metal vessel forming the lower portion of said furnace and a refractory top supported above said metal vessel and forming the upper portion of said furnace, said metal vessel containing a static bed of solid comminuted material selected from the group consisting of said product and a mixture of raw materials adapted to react to form said product, the exterior of said vessel being directly exposed to the surrounding atmosphere, said bed being in direct contact with the interior wall of said metal vessel and having in its upper portion a bowl-shaped recess adapted to contain a molten pool of said product, a series of water-cooled metal cooling elements arranged around said furnace at the junction of said metal vessel and refractory top, said metal cooling elements being directly exposed to the interior of said furnace whereby molten product coming in contact therewith is solidified to form a protective solid layer around said furnace defining the periphery of said pool, heating means in said refractory top for maintaining said pool in molten condition, feeding means mounted in the walls of said furnace for continuously feeding a mixture of said raw materials to said pool, and product withdrawal means for continuously withdrawing molten products from said pool.

11. A furnace adapted to be used in making at high temperature a normally solid product which at the operating temperature of the furnace is molten and corrosive toward the common refractories, said furnace comprising an open top uninsulated rectangular metal tank forming the lower portion of said furnace and a refractory top supported above metal tank and forming the upper portion of said furnace, said tank containing a bed of said product in solid comminuted form, said bed being in direct contact with the interior wall of said metal tank and having in its upper portion a bowl-shaped recess adapted to contain a molten pool of said product, a series of water-cooled metal cooling chambers formed in the side wall of said furnace at the level of said pool, said metal chambers being directly exposed to the interior of said furnace whereby molten product coming into contact with said cooling elements is solidified to form a protective layer defining the periphery of said pool, mounting means for said cooling elements adjustable transversely of the walls of said furnace whereby said cooling elements are transversely movable to accommodate expansion of said bed of product when it is cooled and reheated, a series of screw conveyors mounted in the side wall of said furnace above the level of said pool for continuously feeding to said pool a mixture of raw materials adapted to react and form said product, heating means mounted in the wall of said furnace for supplying heat to said pool to maintain it molten, a forehearth connected to said furnace and providing a passage for removal of molten product from said pool, said forehearth including burners for maintaining the product therethrough in molten condition, a water-cooled dam over which said molten product flows, and cooling means for solidifying the molten product flowing over said dam.

12. A furnace adapted to be used in producing alkaline silicates, said furnace comprising a metal container, a body of solid-phase alkaline silicate in said container, said body of solid silicate having a recess formed in the top central portion thereof adapted to contain and support a pool of molten silicate, a series of burners mounted in a side wall of said furnace above said body of solid silicate for supplying heat to the molten silicate of said pool, a series of water-cooled metal cooling chambers formed in the side walls of said furnace at the level of said pool, said metal chambers being directly exposed to the interior of said furnace, whereby molten silicate near said cooling elements is solidified to form a protective layer defining the periphery of said pool, a mounting for said cooling elements adjustable transversely of the walls of said furnace whereby said cooling elements are transversely movable to accommodate expansion of said body of silicate when it is cooled and reheated, a series of screw conveyors mounted in a side wall of said furnace above the level of said pool for feeding a mixture of sand and soda ash to said pool, a forehearth connected to said furnace and providing a passage for removal of molten product from said pool, said forehearth including burners for maintaining the silicate passing therethrough in molten condition, a water-cooled dam over which said molten silicate flows and cooling means for solidifying the molten product flowing over said dam.

13. A furnace adapted to be used in heating at high temperature a normally solid product which at the operating temperature is molten and relatively corrosive toward the common refractories, said furnace comprising an open top, uninsulated metal vessel forming the lower portion of said furnace and a refractory top supported above said metal vessel and forming the upper portion of said furnace, a bed of solid material in said metal vessel selected from the group consisting of said product and a mixture of raw materials adapted to react to form said product, said bed having in its upper portion a bowl-shaped recess adapted to contain a molten pool of the product to be heated, a series of elongated metal cooling elements arranged around the periphery of said furnace at the junction of said refractory top and the walls of said metal vessel and adjacent to said pool, mounting means for said cooling elements mounted in the side walls of said furnace, said mounting means being adjustable transversely of said side walls whereby said cooling elements are transversely movable to accommodate expansion of said mass of product upon cooling and reheating of the same.

14. A furnace according to claim 13 and wherein said cooling elements are elongated hollow metal chambers cooled by passage of water therethrough.

15. A furnace according to claim 14 and wherein at least one of said cooling elements has a water inlet connection near its bottom, a water outlet connection near its top, and an internal baffle mounted between said connections and extending through said chamber toward the interior of said furnace, said baffle operating to direct the flow of cooling water against surfaces of said cooling element that are adjacent to said pool.

References Cited in the file of this patent

UNITED STATES PATENTS

| | | |
|---|---|---|
| 39,135 | Elkington | July 7, 1863 |
| 214,572 | Leuffgen | Apr. 22, 1879 |
| 682,365 | Mount | Sept. 10, 1901 |
| 945,926 | Fleming | Jan. 11, 1910 |
| 1,149,495 | Carson | Aug. 10, 1915 |
| 1,220,444 | Naismith | Mar. 27, 1917 |
| 1,360,585 | Rupprecht | Nov. 30, 1920 |
| 1,376,617 | Griggs | May 3, 1921 |
| 1,724,340 | Charles | Aug. 13, 1929 |
| 1,906,695 | Lufkin | May 2, 1933 |
| 1,932,354 | Scheidt | Oct. 24, 1933 |
| 1,932,355 | Scheidt | Oct. 24, 1933 |
| 2,042,560 | Stewart | June 2, 1936 |
| 2,073,827 | Black | Mar. 16, 1937 |
| 2,173,825 | Curtis | Sept. 26, 1939 |
| 2,203,288 | Willetts | June 4, 1940 |
| 2,211,733 | Soderberg | Aug. 13, 1940 |
| 2,211,734 | Soderberg | Aug. 13, 1940 |
| 2,243,027 | Baker | May 20, 1941 |
| 2,262,826 | Willetts | Nov. 18, 1941 |
| 2,616,221 | Hanson | Nov. 4, 1950 |

FOREIGN PATENTS

| | | |
|---|---|---|
| 19,289 | Germany | Oct. 3, 1882 |

OTHER REFERENCES

Howarth et al.: "J. Soc. Glass Tech.," vol. 17, Transactions, pages 25–49, (1933), TP845 .S678.